May 4, 1965 C. S. COCKERELL 3,181,638

VEHICLES FOR TRAVELLING OVER LAND AND/OR WATER

Filed Jan. 28, 1963 6 Sheets-Sheet 1

INVENTOR

C. S. COCKERELL

BY

Cameron, Kerkam & Sutton

ATTORNEYS

May 4, 1965 C. S. COCKERELL 3,181,638

VEHICLES FOR TRAVELLING OVER LAND AND/OR WATER

Filed Jan. 28, 1963 6 Sheets-Sheet 2

INVENTOR

C. S. COCKERELL

BY

Cameron, Kerkam & Sutton

ATTORNEYS

May 4, 1965 C. S. COCKERELL 3,181,638

VEHICLES FOR TRAVELLING OVER LAND AND/OR WATER

Filed Jan. 28, 1963 6 Sheets-Sheet 3

INVENTOR

C. S. COCKERELL

BY

Cameron, Kerkam & Sutton

ATTORNEYS

INVENTOR
C. S. COCKERELL
BY
Cameron, Kerkam & Sutton
ATTORNEYS

VEHICLES FOR TRAVELLING OVER LAND AND/OR WATER

Filed Jan. 28, 1963 6 Sheets-Sheet 5

INVENTOR
C. S. COCKERELL
BY
Cameron, Kerkam & Sutton
ATTORNEYS

VEHICLES FOR TRAVELLING OVER LAND AND/OR WATER

Filed Jan. 28, 1963 6 Sheets-Sheet 6

INVENTOR

C. S. COCKERELL

BY

Cameron, Kerkam & Sutton

ATTORNEYS

United States Patent Office 3,181,638

Patented May 4, 1965

3,181,638

VEHICLES FOR TRAVELLING OVER LAND AND/OR WATER

Christopher Sydney Cockerell, Bassett, Southampton, England, assignor to Hovercraft Development Limited, London, England, a British company Filed Jan. 28, 1963, Ser. No. 254,214

Claims priority, application Great Britain, Oct. 2, 1959, 33,535/59

15 Claims. (Cl. 180—7)

Figure 1:
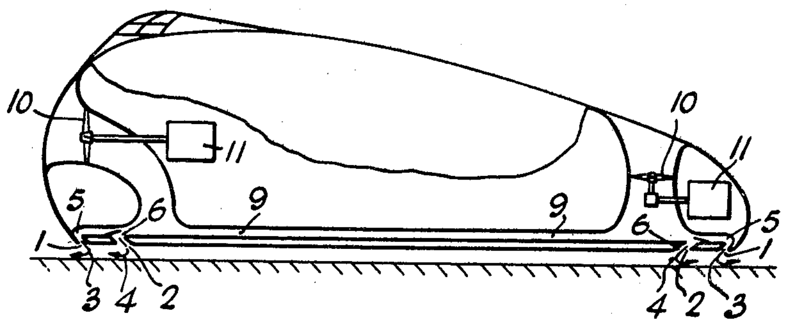

This invention relates to vehicles for travelling over land and/or water, and which are supported above the surface of the land or water by one or more cushions of pressurised fluid.

In co-pending application Serial No. 59,306, filed September 29, 1960, of which this is a continuation-in-part, there are described various arrangements for providing or increasing the stability of the vehicle in heave. The arrangements described in the aforementioned application are concerned, in the main, with means for providing a flow of fluid into the space occupied by the cushion or cushions when the volume of the space decreases. The flow of fluid into or out of the space occupied by the cushion or cushions on variation of the volume thereof, at least partly reduces the variation in the pressure of the cushion or cushions which would otherwise occur. It is the variation of the cushion pressure which gives rise to instability in heave.

The arrangements described in the above mentioned application are mostly applicable to vehicles in which the cushion space is bounded at the periphery by fluid curtains or structural members, or by a combination of both. The present application is concerned with vehicles in which the cushion space is bounded at the periphery at least in part by one or more curtains of fluid. The variations in pressure of the cushion or cushions which result in variations of the lift applied to the vehicle can be offset partly or wholly by varying the effective area of the supporting cushion or cushions.

Thus in vehicles having single fluid curtains, or a multiplicity of parallel fluid curtains, formed from supply ports in the bottom surface of the vehicle, the ports may be movable; and it is an object of the invention to provide means for varying the position of ejection of the fluid forming the curtain or curtains in response to variations in cushion pressure so as to vary the area of the cushion or cushions in such a manner that the effect of the variation in pressure of the cushion or cushions can be at least partly offset.

An alternative method of varying the effective area of the cushion or cushions in vehicles having two or more parallel fluid curtains having secondary fluid cushions between the fluid curtains is by varying the relative mass flows of the fluid curtains. Variation of the relative mass flows of the fluid curtains will vary the relative pressures in the various cushions and alter the effective cushion area. It is a further object of the invention to provide means for varying the relative mass flows of the fluid curtains in response to variations in cushion pressure whereby the effective area of the cushion or cushions may be varied to at least partly offset the effect of the variations in cushion pressure which occur.

In vehicles in which at least part of the curtain forming fluid is recovered into the vehicle through one or more recovery ports formed in the bottom of the vehicle inboard of the position of ejection of the curtain forming fluid, it is possible to vary the area of the cushion or cushions by varying the position of the recovery port. It is another object of the invention to provide means for varying the position of the recovery port through which is recovered at least part of the curtain forming fluid in response to variations in the cushion pressure whereby the area of the cushion or cushions can be varied.

The various means for varying the position of ejection of the curtain forming fluid, for varying the relative mass flows, and for varying the position of the recovery ports, can be controlled by means responsive to one or more values which are affected by the heave of the vehicle, such as cushion pressure, vertical velocity or vertical acceleration. It is an object of the present invention to control the variation of the effective area of the cushion or cushions by means responsive to variation of one or more values, such as cushion pressure, vertical velocity or vertical acceleration which are indicative of variations in lift occurring due to variations in cushion volume, and it is a further object to provide means for providing a predetermined phase relationship between the variation in effective area and any variation in cushion volume.

As described in the above mentioned application, the need to offset the effect of cushion volume variation decreases as the maximum vertical acceleration decreases, for example as the length of waves traversed decreases. It is therefore also an object of the invention to provide means for reducing the response of the means responsive to the value or values indicative of cushion volume variation as the maximum value of vertical acceleration decreases.

Figure 2:
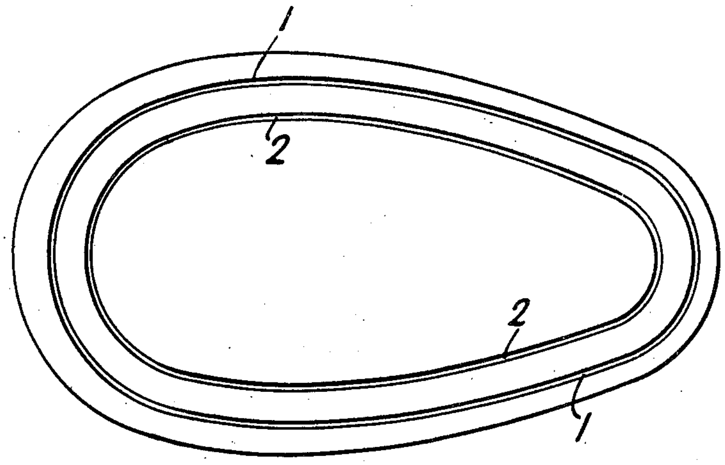
Figure 3:
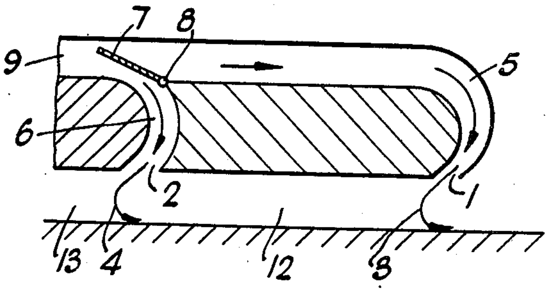
Figure 4:
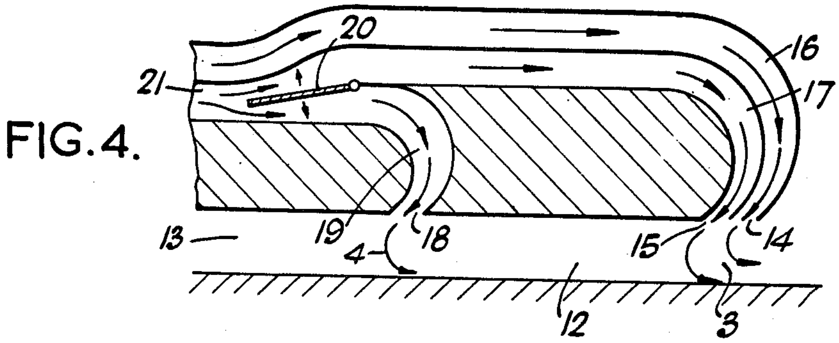
Figure 5:
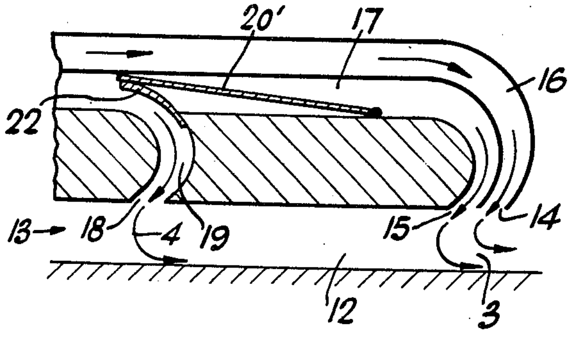
Figure 6:
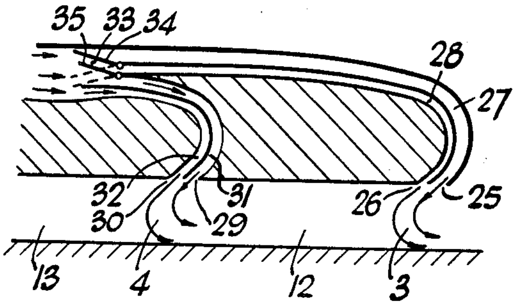
Figure 7:
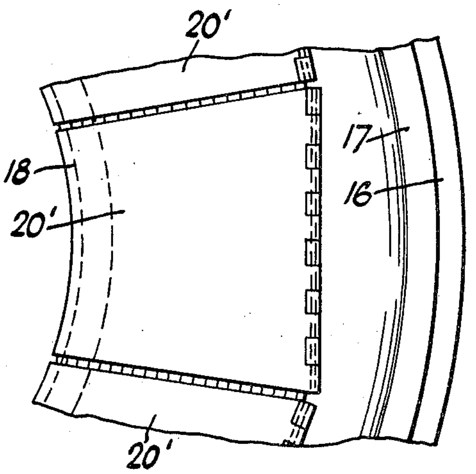
Figure 8:
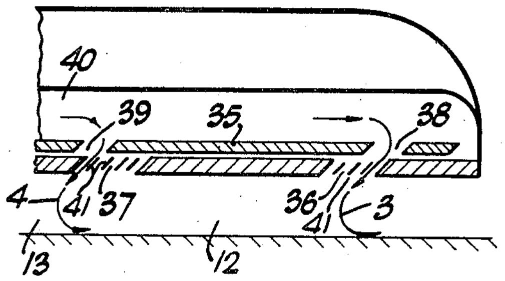
Figure 9:
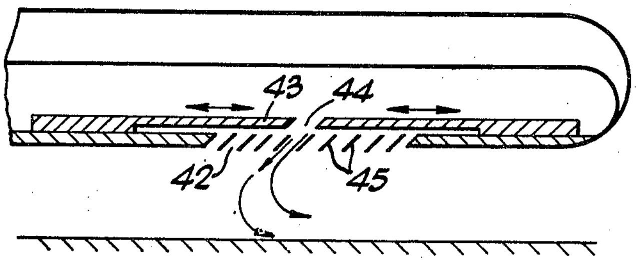
Figure 10:
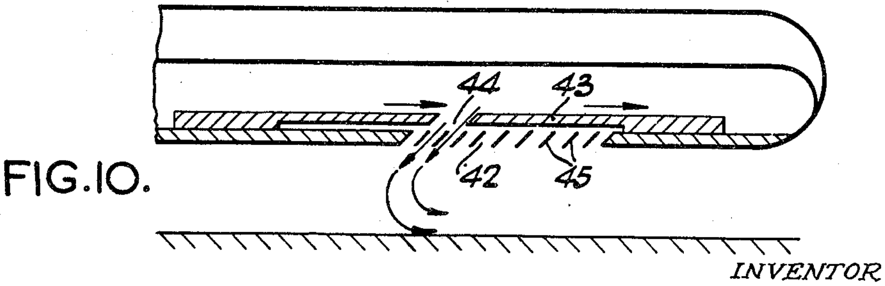
Figure 11:
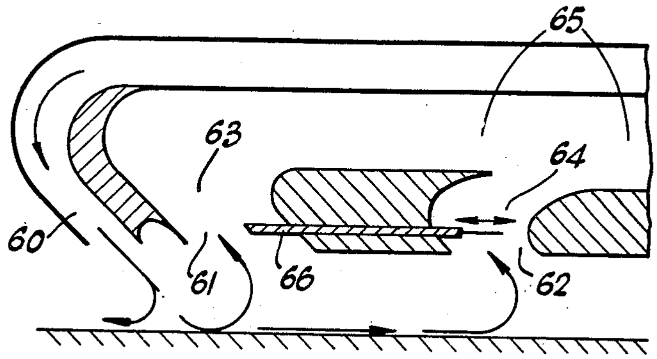
Figure 12:
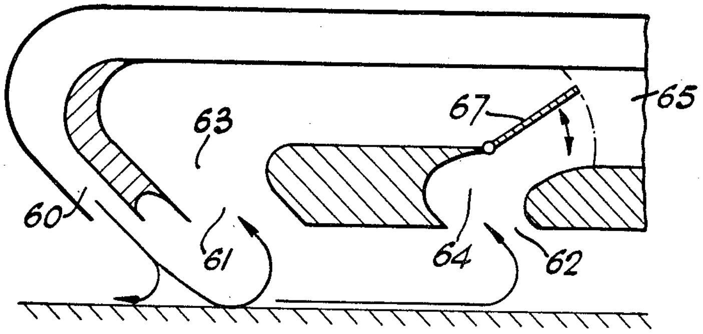
Figure 13:
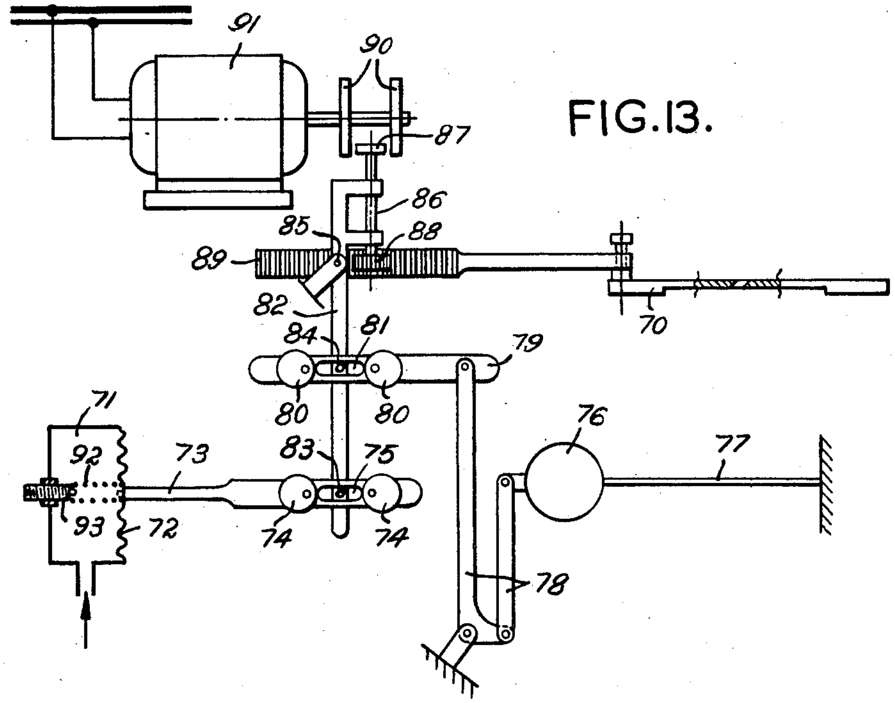

The invention will be readily understood by the following description of certain embodiments of the invention in conjunction with the accompanying drawings in which:

FIGURE 1 is a side view, partially in diagrammatic vertical cross-section on the fore and aft axis of a vehicle, embodying one form of the invention, Figure 2 is an inverted plan view of the vehicle illustrated in FIGURE 1, FIGURE 3 is a diagrammatic fragmentary vertical cross-section, to a larger scale, of the bottom portion of the periphery of the vehicle illustrated in FIGURES 1 and 2, FIGURE 4 is a modification of FIGURE 3, FIGURE 5 is an alternative modification of FIGURE 3, FIGURE 6 illustrates a further form of the embodiment of FIGURE 3, FIGURE 7 is a fragmentary plan view of the detail of a flap as used in the various forms of the embodiment illustrated in FIGURES 1 to 6, FIGURE 8 is a diagrammatic fragmentary vertical cross section of the bottom portion of the periphery of a vehicle illustrating a further embodiment of the invention, FIGURE 9 is a diagrammatic fragmentary vertical cross-section of the bottom portion of the periphery of a vehicle illustrating yet another embodiment of the invention, FIGURE 10 illustrates an alternative operating condition of the embodiment of FIGURE 9, FIGURE 11 is a diagrammatic fragmentary vertical cross-section of the bottom portion of the periphery of a vehicle embodying another form of the invention, FIGURE 12 illustrates a modification of the embodiment of FIGURE 11, FIGURE 13 illustrates diagrammatically one control system particularly adapted for operating the devices of FIGURES 8–11.

Figure 14:
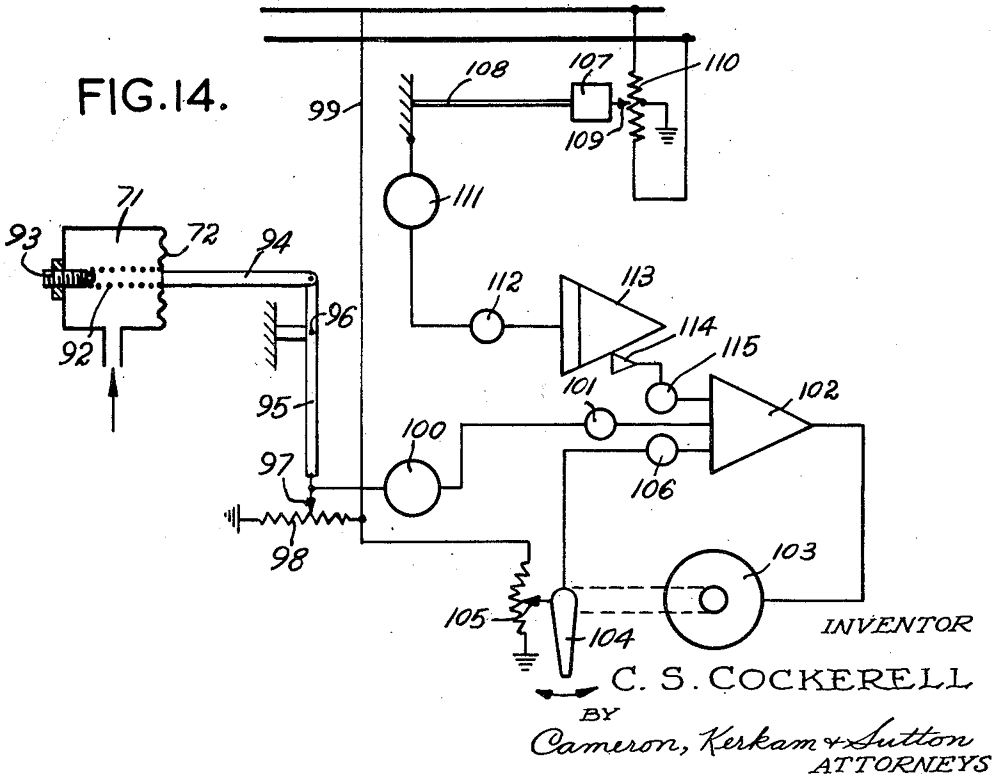
Figure 15:
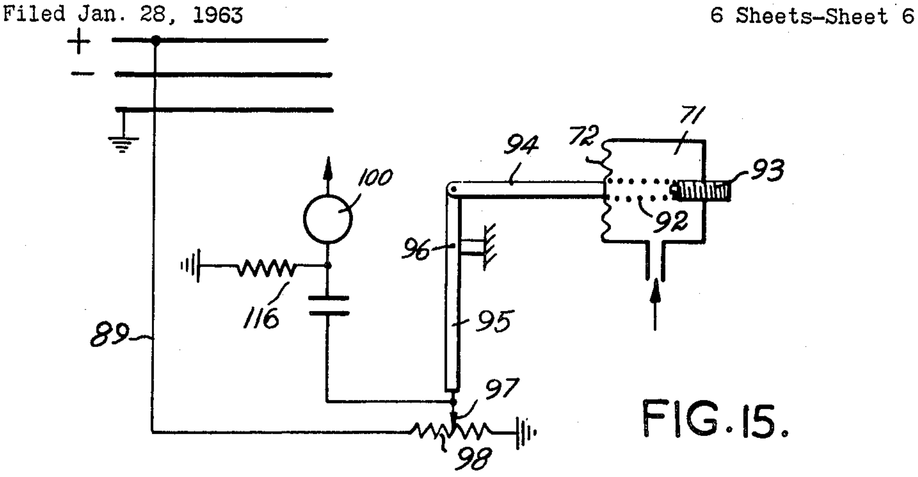
Figure 16:
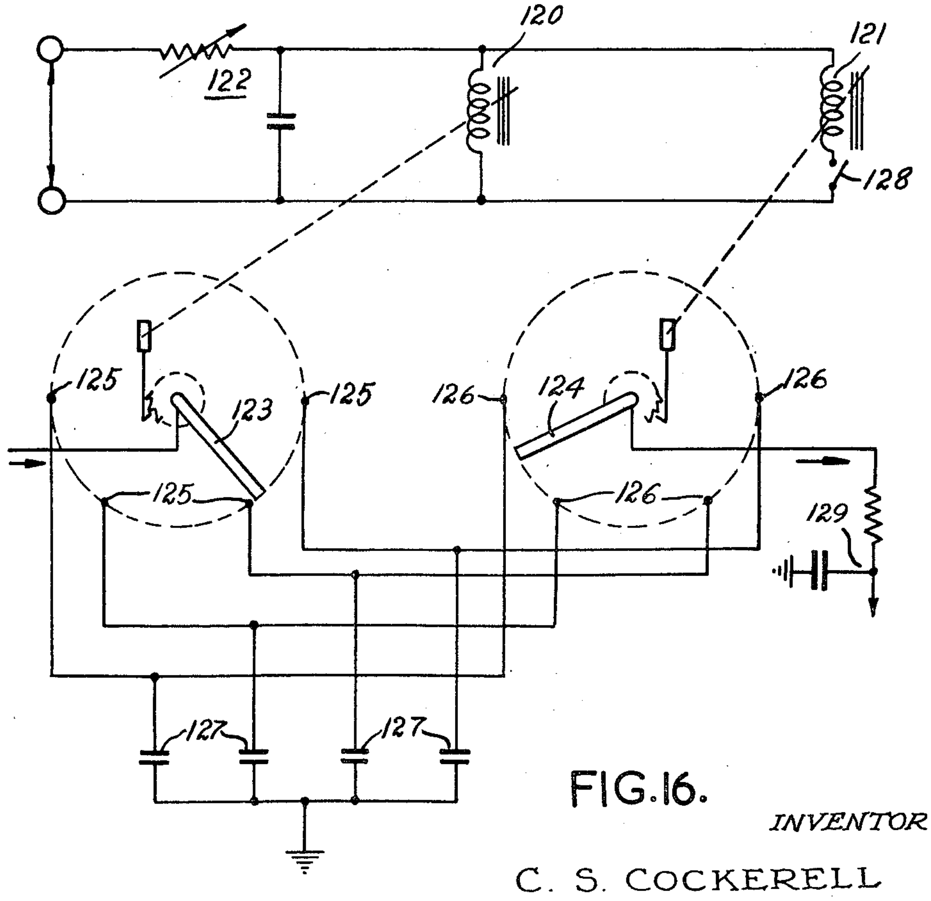

FIGURE 14 illustrates diagrammatically another control system particularly adapted for use with the devices of FIGURES 1–6, FIGURE 15 illustrates a modification of part of the control system of FIGURE 14. and FIGURE 16 illustrates diagrammatically a phase advancing or retarding device suitable for incorporation in the system of FIGURE 14.

When a vehicle is travelling over an undulating surface, the effect of the variation in height, or clearance, between the bottom of the vehicle and the surface will depend upon the wave length of the undulations compared with the length of the vehicle. Where the wave length is submultiple of the vehicle length the vehicle will maintain a substantially level course, rising and falling only when encountering isolated taller crests or deeper troughs of the undulations. At the other extreme, where the wave length is several times the length of the vehicle, the vehicle will follow the profile of the undulations without undue vertical acceleration being imposed. I have found that the range of wave length at which unacceptable vertical accelerations may occur generally lies very roughly between 1 and 2½ times the length of the vehicle. If provisions can be made to cause the vehicle to follow a modified path having a reduced height variation for this range of wave lengths, the undue vertical accelerations which would otherwise occur, can be at least reduced to an acceptable value.

Normally, the fluid forming the cushion is a gas, generally air, although other gases such as exhaust gases or a mixture of air and other gases may be used. The fluid curtains are also generally of air, although other gases or mixture of gases may be used, and also water when operating over a water surface. For convenience hereinafter the fluids for both the cushion and the curtains will be considered as being air.

FIGURES 1, 2 and 3 show an arrangement in which two parallel air curtains 3 and 4 are formed from supply ports 1 and 2 supplied with air by ducts 5 and 6 respectively. A hinged flap 7 is pivotally mounted at 8, at the junction of the two ducts 5 and 6, the position of the flap controlling the amount of air which enters each of ducts 5 and 6 from a common feed duct 9. Air is supplied to the duct 9 by propellors 10 driven by engines 11. A secondary air cushion 12 is formed between the two air curtains 3 and 4, the main air cushion 13 being formed within the inner air curtain 4. By so arranging the relative mass flows of the two air curtains that the pressure of the secondary cushion 12 is intermediate to that of the main cushion 13 and the surrounding atmosphere outside the outer curtain 3 during normal operation, variation of the relative mass flows can be utilised to vary the relative pressures of the main and secondary air cushions. Thus by rotating the flap 7 one way, anti-clockwise in FIGURE 3, the amount of air flowing to the inner air curtain is reduced and that flowing to the outer air curtain is increased. This leads to an increase in pressure of the secondary cushion 12 which is formed between the two air curtains 3 and 4 and thus increases the effective area of the main cushion. Reverse rotation of the flap has the reverse effect.

FIGURES 4 and 5 are variations of the system shown in FIGURES 1–3. In these examples the outer air curtain 3 is in two parts formed from two supply ports 14 and 15, fed by two ducts 16 and 17 respectively, the inner air curtain 4 being formed from a single supply port 18 fed by a duct 19. A hinged flap 20 (20′ in FIGURE 5) operates to vary the relative air flows to the two ducts 17 and 19, the air flow to the duct 16 being separate, and operation of the flap varies the relative air flows to the two supply ports 15 and 18 with the above described effect. In FIGURE 4 the ducts 16 and 17 are raised so that air from the supply source flowing along the duct 21 flows smoothly into the duct 19. In FIGURE 5 the ducts 16 and 17 are not raised and a curved guide vane 22 is hinged on the flap 20′ to give a smooth entry into the duct 19.

In the example shown in FIGURE 6 each air curtain is formed from two supply ports, the outer air curtain 3 from supply ports 25 and 26 fed by ducts 27 and 28 and the inner air curtain 4 from supply ports 29 and 30 fed by ducts 31 and 32 respectively. In each pair of ducts the outer duct 27 or 31 is wider than the inner duct. A hinged valve member 33, formed from two parallel flaps 34 and 35, is mounted at the junction of the ducts, movement of the valve member varying the relative mass flow of air into the outer duct of each air curtain forming system. Air passes between the parallel flaps 34 and 35 into the inner duct 28 of the outer air curtain 3 and flows below the valve member 33 into the inner duct 32 of the inner air curtain 4. The air flow into each of the inner ducts 28 and 32 is virtually unaffected by any movement of the valve member, only the relative flows to the outer ducts 27 and 31 being varied.

In the arrangements shown in FIGURES 1 to 6, where the flap or valve is circular it must be made of flexible material or sectors of stiff material with radial joints of flexible material. This latter construction is shown in FIGURE 7, which is a plan view of a siutable flap 20′ for use in FIGURE 5.

FIGURE 8 illustrates diagrammatically an alternative method of varying relative flows of air to the supply ports, using a sliding flap or plate. A flat plate 35 is mounted on the bottom surface of the vehicle, arranged to slide inwardly and outwardly over the supply ports 36 and 37. The supply ports 36 and 37 are wider in the radial direction than is normally the case, and the sliding plate 35 is provided with ports 38 and 39 which cooperate with the ports 36 and 37 to define the actual ports through which the curtain forming air issues. The ports 38 and 39 are also wider than normal ports, being sufficiently wider for the issue of the maximum additional air it is intended should be transferred. Ports 38 and 39 are positioned in the plate 35 so that when the plate is in its central position the outer edge of the port 38 is slightly outside the outer edge of the port 36 and the inner edge of port 39 is slightly inside the inner edge of port 37, as shown, the unobstructed widths of the ports 38 and 39 being the correct widths for the formation of normal curtains. Air is fed to the ports via a duct 40 and it will be seen that the movement of the plate 35 in or out will vary the relative flows of air out of ports 38 and 39. Vanes 41 may be provided in the wide ports 36 and 37. Whilst the flat plate is shown as being fitted inside the bottom of the vehicle, it can readily be fitted on the outside, but is liable to be damaged.

It will be understood that air is deflected from the inner air curtain system to the outer air curtain system when it is desired to increase the effective area of the cushion to offset any decrease in cushion pressure. The vehicle would normally be arranged to operate with the pressure of the secondary cushion formed between the air curtain system, at for example, half the pressure of the main cushion. It would then be possible to increase the vertical thrust above the normal or to increase the vertical thrust that would otherwise obtain, by raising the pressure of the secondary cushion, and reduce the vertical thrust by reducing the pressure of the secondary cushion.

When only a single air curtain system is formed beneath the vehicle then this air curtain can be moved bodily in or out to vary the effective cushion area. FIGURES 9 and 10 illustrate diagrammatically such a method for moving the position of a port relative to the bottom of the vehicle. The normal narrow port in the vehicle bottom through which the air curtain is formed is replaced by a wide port 42. Mounted over the port is a slidable flat plate 43 having a narrow port 44. Port 44 is equivalent to the normal port formed in the bottom of the vehicle in the previously described vehicles, and may be any desirable configuration such as an annulus or a series of ports in annular or part annular configuration. As shown in FIGURE 9, the port 44 is in its central position. By moving the plate in or out, in a general radial direction, the position of the port and thus the curtain can be varied. If the port 44 is moved inwards towards the centre of the vehicle as shown in FIGURE 10 the edge of the cushion will be moved inwards which will have the effect of reducing the area of the cushion. Conversely moving the port 44 outwards away from the centre of the vehicle has the effect of increasing the area of the cushion. The movable plate 43 is easily provided for straight portions of the ports at the bottom of the vehicle; where the ports are curved, it will be necessary to provide for the plates to slide one over the other as they are moved in and out to allow for the variation in circumferential distance. Vanes 45 may be provided in the wide port 42.

An alternative method of varying the effective area of the cushion, as applied to curtain systems in which at least part of the curtain forming air is recovered, is illustrated in FIGURE 11. A supply port 60 is formed in the bottom of the vehicle at the periphery and a recovery port 61 is also formed in the bottom of the vehicle slightly inboard of the supply port 60. A further recovery port 62 is formed in the bottom of the vehicle spaced further inboard than the first recovery port 61. The recovery ports 61 and 62 communicate via ducts 63 and 64 respectively with a common recovery duct 65. A sliding vane 66 is mounted between the two recovery ports and acts to vary the opening of the ports. In operation, air issues from the supply port 60, and some of the curtain forming air is recovered through recovery port 61, further air being recovered through recovery port 62. The sliding vane 66 can completely close either of the recovery ports, and if for example, the outer recovery port 61 is closed then the cushion extends, effectively, only as far as the inner recovery port 62. Similarly, if the inner recovery port 62 is closed, the cushion extends as far as the outer recovery port 61. A graduation of the effective cushion area between these two limits can be obtained by varying the sliding vane 66.

FIGURE 12 illustrates a method of cushion area variation similar to that shown in FIGURE 11, a rotatable vane 67 being provided to vary the relative amounts of air through the recovery ports 61 and 62, instead of sliding vane 66.

From the foregoing description and the accompanying drawings it will be seen that variations in vertical thrust due to variations in cushion pressure, which latter arise due to variations in cushion volume resulting from variations in height or clearance of the vehicle from a predetermined level, can be at least partly offset by varying the effective area of the supporting cushion or cushions. Such variations in area will of course require that air flows to or from the cushion or cushions. For example, where, as shown in FIGURES 1 to 6, the relative mass flows of multiple curtains is varied, increasing the mass flow to the outer curtain results in a flow of extra air into the secondary cushion space to raise the pressure. Similarly decreasing the mass flow of the outer curtain causes air to flow from the secondary cushion space to decrease the pressure. The variation of mass flow of the inner curtain does not itself have much effect on the air flow into or out of the cushion, the decrease or increase in the mass flow being necessary in order to provide the necessary decrease or increase in strength of the inner curtain in accordance with the decrease in pressure drop across the curtain respectively.

The various devices such as hinged flaps, valve members, sliding plates and vanes and rotatable vanes described above are operated in response to variations in a value or parameter which is indicative of the heave of the vehicle, i.e. the variation of cushion volume due to variation in height. Such parameters of values are: cushion pressure, rate of change of cushion pressure, vertical velocity and vertical acceleration. If desired, the operation of the various devices may have a phase relationship to the variation in cushion volume so as to provide damping of the oscillations. FIGURES 13 to 16 illustrate diagrammatically some control systems suitable for operating the various devices.

FIGURE 13 illustrates a means for controlling a sliding plate 70 such as 35, 43 or 66 in FIGURES 8, 9 and 10 and 11 respectively. The values used for controlling the operation of the plate 70 are cushion pressure and vertical acceleration. The cushion pressure $P_c$ is fed to a closed chamber 71 one vertical wall of which is in the form of a diaphragm 72. Attached to the centre of the diaphragm 72 is a horizontal lever 73 carrying two spaced apart cams 74. Formed in the lever 73 between the two cams is a slot 75. The vertical acceleration of the vehicle is detected by means of a weight 76 mounted on a horizontal reed 77, the reed being rigidly connected to the main vehicle structure. Movement of the weight 76 is transmitted by levers 78 to a horizontal lever 79 also carrying two spaced apart cams 80. A slot 81 is formed in the lever 79 between the two cams 80. A vertical lever 82 and the two horizontal liners 73 and 79 are so arranged that pins 83 and 84 on the lower part of the lever 82 are positioned centrally in the slots 75 and 81 respectively when the diaphragm 72 and the weight 76 are in their mid or inoperative positions.

The vertical lever 82 is pivoted at 85 and at its upper part carries a rotatable member 86. The rotatable member has a friction member 87 at its upper end and a spur gear 88 at its lower end. The spur gear 88 meshes with a rack 89, an extension of which is connected to the sliding plate 70. To avoid reaction forces interfering with the action of the vertical lever 82, the pivot 85 is arranged to be in the centre line of the rack 89. The friction member 87 is positioned between two discs 90 continuously driven by an electric motor 91 in a clockwise direction when viewed from the side opposite to that of the motor.

In operation, on the occurrence of a cushion pressure increase, the increase in pressure is fed to the chamber 71 deflecting the diaphragm 72 and the lever 73 to the right, in FIGURE 13. The slot 75 allows for a delay before the left hand cam 74 contacts the pin 83 and moves the bottom of the lever to the right. A decrease in cushion pressure reverses the operation and the right hand cam contacts the pin 83. The rotational positions of the cams can be varied by means of a spring 92 and a movable abutment 93.

Movement of the bottom of the lever 82 to the right moves the top part of the lever to the left causing the friction member to contact the left hand disc 90. This causes the rotatable member 86 to rotate in an anti-clockwise direction, when viewed from above, and the spur gear 88 is similarly rotated. Rotation of the spur gear moves the rack 89 to the left. In FIGURE 13, the sliding plate 70 has been shown as representing the sliding flat plate 43 of FIGURES 9 and 10. Movement of the plate 70, i.e. the flat plate 43, to the left has the effect of reducing the area of the cushion which is as required. As the vehicle passes over the crest of the undulation, the cushion pressure will decrease and reverse operation of the control system and plate 70 will occur.

Operation of the control in response to vertical acceleration is in a similar manner. Acceleration of the vehicle upwards, as due to a rise in cushion pressure, causes the weight 76 to be displaced downwards. Such displacement of the weight is transmitted by the levers 78 to the horizontal lever 79 moving it to the right, in FIGURE 13. The left hand cam 80 contacts the pin 84 and moves the bottom part of the vertical lever 82 to the right. The sequence of operation is then as described above for operation by cushion pressure.

The slot 81 and the cams 80 provide a means for creating a delay. The vertical lever 82 acts as a summating computer, and the action of the lever 82 is a result of the movement of either or both of the horizontal levers 73 and 79. The operation of the sliding plate 70 can thus be by vertical acceleration, or by change in cushion pressure or by a combination of both.

FIGURE 14 illustrates a system in which variation in cushion pressure and/or vertical velocity is used, and in which a phase variation can be applied to cushion variation response and/or the vertical velocity response. The cushion pressure $P_c$ is fed as before to a closed chamber 71 having one wall formed by a diaphragm 72 carrying a lever 94. In the present invention, the lever 94 is attached to the upper end of a vertical lever 95 pivoted at a position 96 intermediate its ends. The lower end of the lever there is attached the wiper 97 of a potentiometer 98 which is connected between a supply 99 and earth. The voltage from the wiper 97 is fed via a phase advancing network 100, and a coefficient setting device 101 to a summating computer 102. The output from the summating computer is used to drive a servo motor 103 which rotates a hinged flap 104. This flap 104 can be considered as being equivalent to the hinged flaps 7 or 20 or the hinged valve member 33 in FIGURES 1 to 4, or 5 or 6 respectively. The movement of the hinged flap 104 operates a feedback potentiometer 105, the output of which is fed back to the summating computer 102 via a coefficient setting device 106.

The summating computer 102 also receives a signal which is proportional to the vertical velocity of the vehicle. The vertical acceleration of the vehicle is measured by means of a weight 107 on a reed 108 which is rigidly attached to the vehicle structure. Movement of the weight 107 moves a wiper 109 of a potentiometer 110. The voltage from the potentiometer is fed via a phase advancing network 111 and a coefficient setting device 112 to an integrating amplifier 113. The output from the intergrating amplifier is a signal proportional to vertical velocity. This signal is fed, via a further amplifier 114 and coefficient setting device 115 if necessary, to the summating computer 102. Thus the hinged flap 104 is operated in accordance with a variation in cushion pressure, or vertical velocity or in accordance with a combination of both.

FIGURE 15 illustrates a modification of the device sensing changes in cushion pressure, as included in FIGURE 14, for example, by which a signal indicative of rate of change of cushion pressure can be provided. The cushion pressure is fed to the closed chamber 71 as before, movement of the diaphragm 72 moving the levers 94 and 95. Movement of the lever 95 moves the wiper or the potentiometer 98. The output from the potentiometer, instead of being fed direct to the phase advancing network 100 in FIGURE 12, is fed via a capacitor and resistance network 116, the capacitor being in the lead from the potentiometer and the resistance being connected between the lead from the capacitor to the phase advancing network 100 and earth. By such an arrangement an output is only fed to the summating computer during transient conditions the output being proportional to the rate of change of the cushion pressure.

FIGURE 16 illustrates diagrammatically a phase advance or phase lag device which can be used for the phase advance networks 100 and 111 in FIGURE 14. Two solenoids 120 and 121 are energised by a resistor-capacitor network 122 and rotate the wiper arms 123 and 124, respectively at a constant rate. An input, for example from the potentiometer 98 or 110 in FIGURE 14, is fed to the wiper arm 123 which moves over a series of contacts 125. Each contact 125 is connected to a corresponding contact 126 over which moves the wiper arm 124, each of the pair of interconnected contacts 125 and 126 being in the same rotational position. The pairs of contacts are connected to earth via capacitor 127 as shown. The input applied to the wiper arm 123 charges the capacitors 127 in turn and the wiper arm 124 picks off an output from the capacitors as it rotates. If both wiper arms are at the same angular position then the output will be in phase with the input. If the wiper arm 124 is rotated relative to the arm 123 by the switch 128 for example, then the output will have a phase relationship relative to the input. Such a phase advance and lag device is preferably used only for regularly occurring undulations, such as would occur over waves. The output from the wiper arm 124 is smoothed by a capacitor-resistor network 129 and is then fed to the summating computer 102, as in FIGURE 14.

Thus, using combinations of the various sensing devices described above, it is possible to control the flaps, valve members or vanes, as in FIGURES 1 to 12, in response to variations in various parameters such as cushion pressure, vertical velocity and vertical acceleration. It is possible to provide for a gradual cutting out of the control device as the wave length of the undulations increases, by providing delays as in FIGURE 13. The delays provided by the slots 75 and 81 in combination with the cams 74 and 80 provide a means whereby when the change of cushion pressure, or the vertical acceleration, is below a certain value, the control system does not operate, and also in which the action of the control device decreases gradually as this value is approached more nearly.

I claim:

1. A vehicle for travelling over a surface comprising means for forming and maintaining a cushion of pressurized fluid beneath tthe vehicle by which said vehicle is at least partly supported above said surface, including means responsive to variations in the cushion pressure for varying the effective area of the cushion, said means being so constructed and arranged as to decrease the area when the cushion pressure tends to increase and increase the area when the cushion pressure tends to decrease whereby the variations in vertical thrust on the vehicle produced by variations in the cushion pressure are reduced.

2. A vehicle as claimed in claim 1 including means for forming at least one curtain of fluid which at least partly forms and contains the cushion of pressurized fluid.

3. A vehicle as claimed in claim 2 wherein the means responsive to variations in cushion pressure are operative to vary the position at which issues at least part of the curtain forming fluid, said means being so constructed and arranged as to vary the position inwards when the cushion pressure tends to increase and outwards when the cushion pressure tends to decrease.

4. A vehicle as claimed in claim 3 including at least one supply port through which the curtain forming fluid issues, the said supply port being moved inwards when the cushion pressure tends to increase and outwards when the cushion pressure tends to decrease.

5. A vehicle as claimed in claim 4 including power operated means for controlling the position of the supply port.

6. A vehicle for travelling over a surface comprising means for forming and maintaining a cushion of pressurized fluid beneath the vehicle by which said vehicle is at least partly supported above said surface, including means responsive to variations in the cushion pressure for varying the effective area of the cushion, at least one curtain of fluid which at least partly forms and contains the cushion, and means for forming at least one further curtain of fluid spaced from but substantially parallel to the said first-named curtain, the said means responsive to variations in cushion pressure being so constructed and arranged as to direct at least part of the fluid normally flowing to the inner of the two said curtains to the outer curtain when the cushion pressure tends to decrease.

7. A vehicle as claimed in claim 6 including power operated means for controlling the said means for directing the flow of fluid.

8. A vehicle for travelling over a surface comprising means for forming and maintaining a cushion of pressurized fluid beneath the vehicle by which said vehicle is at least partly supported above said surface, including means responsive to variations in the cushion pressure for varying the effective area of the cushion, at least one curtain of fluid which at least partly forms and contains the cushion, at least one recovery port formed in the bottom of the vehicle inboard of the curtain forming means, and means for varying the mass flow of the curtain forming fluid into the recovery port, whereby the effective area of the cushion is varied.

9. A vehicle as claimed in claim 8 including at least one further recovery port formed in the bottom of the vehicle inboard of the said first-named recovery port, and means for varying the relative mass flows of the curtain forming fluid which flows into each recovery port, whereby the effective area of the cushion is varied.

10. A vehicle as claimed in claim 8 including power operated means for controlling the means for varying the mass flow into the recovery port.

11. A vehicle as claimed in claim 5 in which the power operated means operate in response to variations of a parameter which varies with variation in vertical thrust produced by the cushion pressure.

12. A vehicle as claimed in claim 11 in which the power operated means operates in a phase relationship with and in opposition to the vertical acceleration of the vehicle.

13. A vehicle as claimed in claim 7 in which the power operated means operates in response to variations of a parameter which varies with variation in vertical thrust produced by the cushion.

14. A vehicle as claimed in claim 13 in which the power operated means operates in a phase relationship with and in opposition to the vertical velocity of the vehicle.

15. A vehicle as claimed in claim 13 in which the power operated means operates in a phase relationship with and in opposition to the vertical acceleration of the vehicle.

References Cited by the Examiner

FOREIGN PATENTS 1,238,499 7/60 France.

A. HARRY LEVY, *Primary Examiner.*

PHILIP ARNOLD, *Examiner.*